United States Patent
Hoshi et al.

(10) Patent No.: US 10,329,373 B2
(45) Date of Patent: Jun. 25, 2019

(54) POLYISOCYANATE MONOMER COMPOSITION FOR OPTICAL MEMBERS, AND OPTICAL MEMBER AND PRODUCTION METHOD THEREFOR

(71) Applicant: HOYA LENS THAILAND LTD., Thanyaburi, Patumthani (TH)

(72) Inventors: Yuji Hoshi, Tokyo (JP); Masahisa Kousaka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 129 days.

(21) Appl. No.: 15/129,852

(22) PCT Filed: Mar. 5, 2015

(86) PCT No.: PCT/JP2015/056486
§ 371 (c)(1),
(2) Date: Sep. 28, 2016

(87) PCT Pub. No.: WO2015/146527
PCT Pub. Date: Oct. 1, 2015

(65) Prior Publication Data
US 2017/0137560 A1  May 18, 2017

(30) Foreign Application Priority Data

Mar. 28, 2014 (JP) ................. 2014-070605
Mar. 28, 2014 (JP) ................. 2014-070606
Mar. 28, 2014 (JP) ................. 2014-070607

(51) Int. Cl.
| | |
|---|---|
| C08G 18/76 | (2006.01) |
| C08G 18/24 | (2006.01) |
| G02B 1/04 | (2006.01) |
| C08L 75/04 | (2006.01) |
| C08L 75/08 | (2006.01) |
| C08G 18/38 | (2006.01) |
| C08G 18/48 | (2006.01) |

(52) U.S. Cl.
CPC ....... *C08G 18/7671* (2013.01); *C08G 18/242* (2013.01); *C08G 18/246* (2013.01); *C08G 18/3876* (2013.01); *C08G 18/4829* (2013.01); *C08L 75/04* (2013.01); *C08L 75/08* (2013.01); *G02B 1/04* (2013.01); *C08L 2205/025* (2013.01); *G02B 1/041* (2013.01)

(58) Field of Classification Search
None
See application file for complete search history.

(56) References Cited

U.S. PATENT DOCUMENTS

| | | | |
|---|---|---|---|
| 5,563,232 A | 10/1996 | Hurley et al. | |
| 6,051,733 A | 4/2000 | Weissman | |
| 6,310,161 B1 | 10/2001 | Weissman | |
| 2009/0247697 A1 | 10/2009 | Finder et al. | |
| 2014/0200323 A1 | 7/2014 | Itoh et al. | |
| 2014/0296431 A1 | 10/2014 | Kousaka | |
| 2016/0216407 A1* | 7/2016 | Kojima | G02C 7/104 |
| 2016/0264743 A1* | 9/2016 | Ishikawa | C08G 18/3876 |

FOREIGN PATENT DOCUMENTS

| | | |
|---|---|---|
| CN | 102604038 A | 7/2012 |
| JP | H06-220155 A | 8/1994 |
| JP | H08-20625 A | 1/1996 |
| JP | H11-504314 A | 4/1999 |
| JP | 2009-091522 A | 4/2009 |
| JP | 2009-525363 A | 7/2009 |
| JP | 2010-083773 A | 4/2010 |
| JP | 2011-515544 A | 5/2011 |
| JP | 2013-256575 A | 12/2013 |
| WO | 2013/032010 A1 | 3/2013 |

OTHER PUBLICATIONS

May 19, 2015 Search Report issued in International Patent Application No. PCT/JP2015/056486.

* cited by examiner

*Primary Examiner* — Jeffrey D Washville
(74) *Attorney, Agent, or Firm* — Oliff PLC

(57) ABSTRACT

Provided are a polyisocyanate monomer composition for optical members, from which an optical members with which turbidity and clouding are difficult to occur during the production thereof, and which is excellent in transparency, can be obtained, and an optical member and production methods therefor. A polyisocyanate monomer composition for optical members, including 4,4'-diphenylmethane diisocyanate and at least one kind selected from 2,4'-diphenylmethane diisocyanate and 2,2'-diphenylmethane diisocyanate; an optical member formed of a polymer having a structure represented by the following formula (1), and at least one kind of structure represented by the following formula (2) or (3); and a method for producing an optical member, including a step of polymerizing a monomer composition including a polyisocyanate compound including 4,4'-diphenylmethane diisocyanate and at least one kind selected from 2,4'-diphenylmethane diisocyanate and 2,2'-diphenylmethane diisocyanate, and at least one kind selected from a polythiol compound and a polyol compound.

5 Claims, No Drawings

POLYISOCYANATE MONOMER COMPOSITION FOR OPTICAL MEMBERS, AND OPTICAL MEMBER AND PRODUCTION METHOD THEREFOR

TECHNICAL FIELD

The present invention relates to a polyisocyanate monomer composition for optical members, an optical member, and a production method therefor.

BACKGROUND ART

Polythiol compounds or polyol compounds, and polyisocyanate compounds are widely used as the raw materials for urethane-based optical members. Among polyisocyanate compounds, aromatic polyisocyanate compounds are produced inexpensively and in large amounts, and can contribute to the improvement of refractive indices, and thus are preferable as raw materials for urethane-based optical members for which specifically high refractive indices are required. Specifically, 4,4'-diphenylmethane diisocyanate (hereinafter also referred to as "4,4'-MDI") is useful as a raw material monomer for optical members having high refractive indices, from the viewpoints that they are easily available in industries, and that refractive indices are easily improved. For example, Patent Literature 1 describes that a thiol compound having a specific structure and an aromatic polyisocyanate compound are used as raw materials as a polymerizable composition for use in an optical resin that can impart a high refractive index, and 4,4'-MDI is used in Examples and Comparative Examples (Examples 6 and 7).

However, 4,4'-MDI is a compound rich in reactivity, and for example, a part of the isocyanate groups reacts with the moisture in the air to generate an amine, and the amine reacts with the isocyanate groups of other molecules to generate urea bonds, whereby a compound in which molecules are linked by urea bonds is formed. Therefore, in the case when a use amount of 4,4'-MDI is increased in accordance with increasing of a refractive index desired for an optical member to such a higher refractive index that goes beyond about 1.60, a problem that turbidity and clouding, which are deemed to be caused by the precipitation of the above-mentioned compound linked by urea bonds, easily appear in the obtained optical member, and thus the optical member is poor in transparency, was caused.

As a technique for solving such problem, Patent Literature 2 describes that an urethane-based optical member that causes no turbidity and clouding, is excellent in transparency and has a high refractive index can be obtained by putting a compound formed by linking molecules by urea bonds by mixing 4,4'-MDI into a dissolved state in a polyisocyanate compound as a raw material, reacting the obtained compound with a polythiol compound, to thereby incorporate the compound in a structure that forms an optical member.

CITATION LIST

Patent Literature

Patent Literature 1: JP 2010-83773 A
Patent Literature 2: JP 2013-256575 A

SUMMARY OF INVENTION

Technical Problem

However, although the polymerization was conducted at a polymerization initiation temperature within a relatively high range of from 50° C. to 80° C. in Examples in the technique described in Patent Literature 2, turbidity and clouding are generated in some cases when the ratio of 4,4'-MDI is increased in the range of polymerization initiation temperatures that are preferable for the production of the urethane-based optical member in view of suppression of stria (more than 0° C. and lower than 45° C.)

The present inventors considered as to the above-mentioned problem, and found that turbidity and clouding can be suppressed by using 4,4'-MDI as a polyisocyanate compound and other polyisocyanate compound such as xylylene diisocyanate (XDI) in combination, but it was necessary to use a relatively large amount of other polyisocyanate compound, an excellent refractive index was not able to be obtained, and the transparency of the obtained optical member was not sufficient.

Furthermore, since oligomerization, which causes turbidity and clouding, easily occurs in 4,4'-MDI, the inventors found that turbidity and clouding can be suppressed by conducting precise filtration as a pre-treatment, but the steps became complex, the producibility decreased, and the transparency of the obtained optical member was not sufficient.

In the above-mentioned Patent Literature 2, the urethane-based optical member was produced by a reaction with a polythiol compound, but a reaction with a polyol compound, which generally has a higher reactivity and a lower refractive index than those of the polythiol compound, was not considered.

The object of the present invention is to provide a polyisocyanate monomer composition for optical members, which can provide an optical member with which turbidity and clouding are difficult to generate, and which is excellent in transparency, and an optical member and a production method therefor.

Solution to Problem

The present inventors proceeded intensive studies, and consequently found that, although 4,4'-MDI, 2,4'-MDI and 2,2'-MDI are all solid compounds at an ordinary temperature, a mixture containing 4,4'-MDI and at least one kind selected from 2,4'-MDI and 2,2'-MDI becomes a liquid, and an optical member with which turbidity and clouding are difficult to occur during the production thereof and which is excellent in transparency can be obtained by polymerizing a monomer composition containing this mixture, and completed the present invention.

Specifically, the present invention provides the polyisocyanate monomer composition for optical members, the optical member, and the production method therefor shown below.

[1] A polyisocyanate monomer composition for optical members, including 4,4'-diphenylmethane diisocyanate, and at least one kind selected from 2,4'-diphenylmethane diisocyanate and 2,2'-diphenylmethane diisocyanate.

[2] The polyisocyanate monomer composition for optical members according to [1], wherein the rate of the total of the 2,4'-diphenylmethane diisocyanate and 2,2'-diphenylmethane diisocyanate with respect to the total amount of the polyisocyanate monomer composition for optical members is 5% by mass or more.

[3] The polyisocyanate monomer composition for optical members according to [1] or [2], wherein the rate of the total of the 4,4'-diphenylmethane diisocyanate with respect to the total amount of the polyisocyanate monomer composition for optical members is 10% by mass or more.

[4] An optical member including a polymer having a structure represented by the following formula (1), and at least one kind of structure represented by the following formula (2) or (3):

[Formula 1]

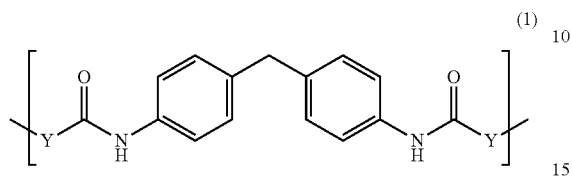
(1)

wherein Y represents a sulfur atom or an oxygen atom;

[Formula 2]

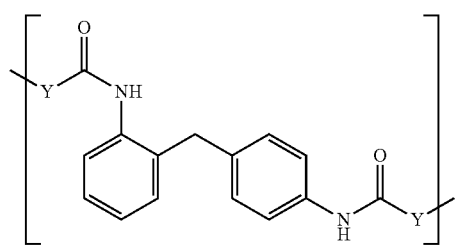
(2)

wherein Y represents a sulfur atom or an oxygen atom; and

[Formula 3]

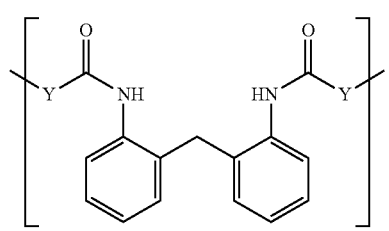
(3)

wherein Y represents a sulfur atom or an oxygen atom.

[5] The optical member according to [4], including a polymer having a structure represented by the following formula (S1), and at least one kind of structure represented by the following formula (S2) or (S3):

[Formula 4]

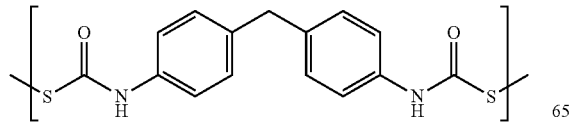
(S1)

[Formula 5]

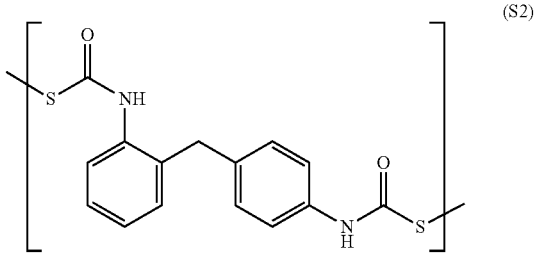
(S2)

[Formula 6]

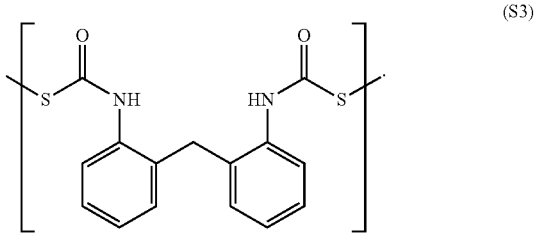
(S3)

[6] The optical member according to [5], wherein the numerical ratio (M2/M1) of the total (M2) of the structures of residues formed by removing the two isocyanate groups from the 2,4'-diphenylmethane diisocyanate or the 2,2'-diphenylmethane diisocyanate with respect to the total (M1) of the structures of residues formed by removing the two isocyanate groups of the 4,4'-diphenylmethane diisocyanate contained in the polymer is 5/95 or more.

[7] The optical member according to [4], including a polymer having a structure represented by the following formula (O1), and at least one kind of structure represented by the following formula (O2) or (O3):

[Formula 7]

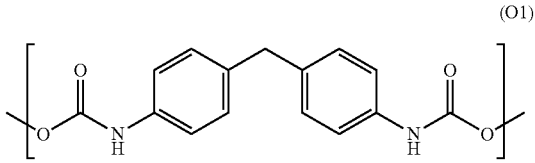
(O1)

[Formula 8]

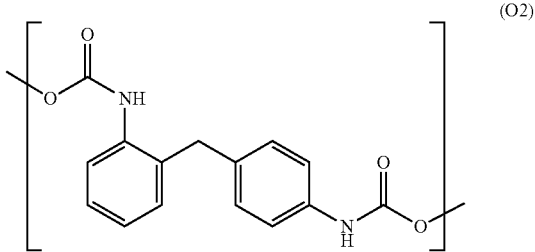
(O2)

-continued

[Formula 9]

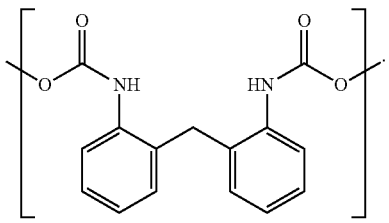
(O3)

[8] The optical member according to [7], wherein the numerical ratio (M2/M1) of the total (M2) of the structures of residues formed by removing the two isocyanate groups from the 2,4'-diphenylmethane diisocyanate or the 2,2'-diphenylmethane diisocyanate with respect to the total (M1) of structures of residues formed by removing the two isocyanate groups of the 4,4'-diphenylmethane diisocyanate contained in the polymer is more than 5/95.

[9] A method for producing an optical member, including a step of polymerizing a monomer composition including a polyisocyanate compound including 4,4'-diphenylmethane diisocyanate and at least one kind selected from 2,4'-diphenylmethane diisocyanate and 2,2'-diphenylmethane diisocyanate, and at least one kind selected from a polythiol compound and a polyol compound.

[10] The method for producing an optical member according to [9], including a step of polymerizing a monomer composition including a polyisocyanate compound including 4,4'-diphenylmethane diisocyanate and at least one kind selected from 2,4'-diphenylmethane diisocyanate and 2,2'-diphenylmethane diisocyanate, and a polythiol compound.

[11] The method for producing an optical member according to [10], which satisfies the following formulas (Sa), (Sb) and (Sc):

$$Y \geq -X+45 \qquad \text{(Sa)}$$

$$0 < X \qquad \text{(Sb)}$$

$$0 < Y < 45 \qquad \text{(Sc)}$$

wherein X represents a total rate (% by mass) of the 2,4'-diphenylmethane diisocyanate and the 2,2'-diphenylmethane diisocyanate with respect to the total amount of the polyisocyanate compound, and Y represents a polymerization initiation temperature (° C.) at which the monomer composition is polymerized.

[12] The method for producing an optical member according to [10] or [11], wherein the total rate of the 2,4'-diphenylmethane diisocyanate and the 2,2'-diphenylmethane diisocyanate with respect to the total amount of the polyisocyanate compound is 5% by mass or more.

[13] The method for producing an optical member according to [9], including a step of polymerizing a monomer composition including a polyisocyanate compound including 4,4'-diphenylmethane diisocyanate and at least one kind selected from 2,4'-diphenylmethane diisocyanate and 2,2'-diphenylmethane diisocyanate, and a polyol compound.

[14] The method for producing an optical member according to [13], which satisfies the following formulas (Oa), (Ob) and (Oc):

$$Y \geq -0.46X+45 \qquad \text{(Oa)}$$

$$0 < X \qquad \text{(Ob)}$$

$$0 \leq Y < 45 \qquad \text{(Oc)}$$

wherein X represents a total rate (% by mass) of the 2,4'-diphenylmethane diisocyanate and the 2,2'-diphenylmethane diisocyanate with respect to the total amount of the polyisocyanate compound, and Y represents a polymerization initiation temperature (° C.) at which the monomer composition is polymerized.

[15] The method for producing an optical member according to [13] or [14], wherein the total rate of the 2,4'-diphenylmethane diisocyanate and the 2,2'-diphenylmethane diisocyanate with respect to the total amount of the polyisocyanate compound is more than 5% by mass.

Advantageous Effect of Invention

According to the present invention, a polyisocyanate monomer composition for optical members from which an optical member with which turbidity and clouding are difficult to occur during the production thereof and which is excellent in transparency can be obtained, and an optical member and a production method therefor can be provided.

Furthermore, according to the polyisocyanate monomer composition for optical members of the present invention, an optical member that has a higher refractive index than that of an optical member obtained by using 4,4'-MDI as a polyisocyanate compound and other polyisocyanate compound such as xylylene diisocyanate (XDI) in combination, and an optical member having an excellent transparency can be obtained without conducting microfiltration as a pretreatment. Therefore, the polyisocyanate monomer composition also contributes to the excellent producibility of optical members.

Furthermore, the optical member of the present invention has a higher refractive index than that of an optical member obtained by using 4,4'-MDI as a polyisocyanate compound and other polyisocyanate compound such as xylylene diisocyanate (XDI) in combination, and an optical member having an excellent transparency can be obtained without conducting microfiltration as a pretreatment. Therefore, the optical member is also excellent in producibility.

DESCRIPTION OF EMBODIMENTS

[Monomer Composition]

The polyisocyanate monomer composition for optical members (hereinafter also simply referred to as "monomer composition") of the present invention contains 4,4'-MDI, and at least one kind selected from 2,4'-MDI and 2,2'-MDI. Furthermore, the monomer composition preferably contains 4,4'-MDI and 2,4'-MDI.

The total rate of the 2,4'-MDI and 2,2'-MDI monomer with respect to the total amount of the monomer composition is preferably 5% by mass or more, more preferably 10% by mass or more, further preferably 15% by mass or more, even more preferably 20% by mass or more, even more preferably 30% by mass or more, so as to prevent generation of clouding even when the polymerization initial temperature during the production of the optical member is decreased. Furthermore, the rate is preferably 95% by mass or less, more preferably 90% by mass or less, further preferably 80% by mass or less.

The total rate of the 4,4'-MDI with respect to the total amount of the monomer composition is preferably 10% by mass or more, more preferably 20% by mass or more, so as to prevent generation of clouding even when the polymerization initial temperature during the production of the optical member is decreased. Furthermore, the rate is preferably 90% by mass or less, more preferably 85% by mass or less, further preferably 80% by mass or less, even more preferably 70% by mass or less.

The mass ratio of the at least one kind selected from 2,4'-MDI and 2,2'-MDI to the 4,4'-MDI [(2,4'-MDI and 2,2'-MDI)/4,4'-MDI] is preferably 5/95 or more, more preferably 10/90 or more, further preferably 15/85 or more, even more preferably 20/80 or more, even more preferably 30/70 or more, so as to prevent generation of clouding even when the polymerization initial temperature during the production of the optical member is decreased. Furthermore, the mass ratio is preferably 95/5 or less, more preferably 90/10 or less, further preferably 80/20 or less.

The monomer composition of the present invention is used for producing an optical member.

The method for producing an optical member can include steps of mixing a polyisocyanate monomer composition for optical members containing 4,4'-MDI, and at least one kind selected from 2,4'-MDI and 2,2'-MDI, and an active hydrogen compound selected from a polythiol compound, a polyol compound and a polyamine compound, and polymerizing the mixture.

It is preferable that the above-mentioned production method further includes a step of dissolving a mixture of polyisocyanate compounds containing 4,4'-MDI and at least one kind selected from 2,4'-MDI and 2,2'-MDI by heating under a condition of 30° C. or more and 120° C. or less before the polymerization step. By dissolving the insoluble components contained in the above-mentioned mixture of the polyisocyanate compounds by the step of dissolving by heating, generation of white turbidity in the steps of producing an optical member can be prevented.

The step of dissolving by heating is conducted, for example, by mixing the above-mentioned polyisocyanate compounds, and heating the mixture under stirring. The dissolution by heating is preferably conducted under an inert gas atmosphere.

The temperature for the dissolution by heating is preferably 40° C. or more, more preferably 50° C. or more, preferably 100° C. or less, more preferably 80° C. or less, further preferably 70° C. or less.

The heating time is preferably 5 minutes or more and 30 minutes or less, more preferably 5 minutes or more and 10 minutes or less.

(Polythiol Compound)

Examples of the polythiol compound include, for example, ethylene glycol bis(2-mercaptoacetate), pentaerythritol tetra(2-mercaptoacetate), dipentaerythritol hexakis(2-mercaptoacetate), pentaerythritol tetra(3-mercaptopropionate), trimethylolethane tris(2-mercaptoacetate), trimethylolethane tris(3-mercaptopropionate), trimethylolpropane tris(2-mercaptoacetate), trimethylolpropane tris(3-mercaptopropionate), dichloroneopentyl glycol bis(3-mercaptopropionate), dibromoneopentyl glycol bis(3-mercaptopropionate), 2,5-bismercaptomethyl-1,4-dithiane, 4,5-bismercaptomethyl-1,3-dithiane, bis[(2-mercaptoethyl)thio]-3-mercaptopropane, bis(mercaptomethyl)-3,6,9-trithiaundecane-1,11-dithiol,
1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 3,4-thiophenedithiol, tetrahydrothiophene-2,5-bismercaptomethyl, 2,5-dimercapto-1,3,4-thiadiazole, 2,5-dimercapto-1,4-dithiane, 2,3-bis(2-mercaptoethylthio)propane-1-thiol, and the like. These polythiol compounds may be used singly, or two or more kinds may also be used.

The polythiol compound is preferably at least one kind selected from pentaerythritol tetra(3-mercaptopropionate), 2,3-bis(2-mercaptoethylthio)propane-1-thiol and trimethylolpropane tris(3-mercaptopropionate), more preferably at least one kind selected from pentaerythritol tetra(3-mercaptopropionate), and 2,3-bis(2-mercaptoethylthio)propane-1-thiol, further preferably pentaerythritol tetra(3-mercaptopropionate).

(Polyol Compound)

Examples of the polyol compound include, for example, aliphatic polyols such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, sorbitol, erythritol, treitol, ribitol, arabinitol, xylitol, alytol, mannitol, dulcytol, iditol, glycol, inocytol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5,2,1,0,2,6]decane-dimethanol, bicyclo[4.3.0]nonanediol, dicyclohexanediol, tricyclo[5.3.1.1]dodecanediol, bicyclo[4,3,0]nonanedimethanol, tricyclo[5,3,1,1]dodecane-diethanol, hydroxypropyltricyclo[5,3,1,1]dodecanol, spiro[3.4]octanediol, butylcyclohexanediol, 1,1-bicyclohexylidenediol, cyclohexanetriol, and maltitol, lactitol, aromatic polyols such as dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xyleneglycol, and tetrabromobisphenol A, sulfur atom-containing polyols such as di-(2-hydroxyethyl)sulfide, 1,2-bis-(2-hydroxyethylmercapto)ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl)sulfone (brand name: bisphenol S), tetrabromobisphenol S, tetramethylbisphenol S, 4,4'-thiobis(6-tert-butyl-3-methylphenol), and 1,3-bis(2-hydroxyethylthioethyl)-cyclohexane, polyalkylenene oxide ethers of polyols such as polyoxypropylene glyceryl ether, polyoxyethylene glyceryl ether, polyoxypropylene trimethylolpropyl ether and polyoxypropylene pentaerythritol ether, and the like. These polyol compounds may be used singly, or two or more kinds may be used.

Examples of the polyamine compound include, for example, 3,5-diethyl-2,4-diaminotoluene, 3,5-diethyl-2,6- diaminotoluene, 3,5-dithiomethyl-2,4-diaminotoluene, 3,5-dithiomethyl-2,6-diaminotoluene and the like.

The incorporation rate of the polyisocyanate compound and the active hydrogen compound is such that the molar ratio of NCO group/active hydrogen group is generally from 0.5 to 2.0, preferably from 0.95 to 1.05. Examples of the active hydrogen group include a hydroxy group, a mercapto group, and an amino group.

Besides the above-mentioned raw material monomers, other monomer components such as a compound having an episulfide group and the like may also be used.

Examples of the compound having an episulfide group include, for example, alicyclic skeleton-containing episulfide compounds such as 1,3- and 1,4-bis(β-epithiopropylthio)cyclohexanes, 1,3- and 1,4-bis(β-epithiopropylthiomethyl)cyclohexanes, bis[4-(β-epithiopropylthio)cyclohexyl]methane, 2,2-bis[4-(β-epithiopropylthio)cyclohexyl]propane, and bis[4-(β-epithiopropylthio)cyclohexyl]sulfide; aromatic skeleton-containing episulfide compounds such as 1,3- and 1,4-bis(p-epithiopropylthio)benzenes, 1,3- and 1,4-bis(β-epithiopropylthiomethyl)benzenes, bis[4-(β-epithiopropylthio)-phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfide, and 4,4-bis(β-epithiopropylthio)biphenyl; dithiane ring skeleton-containing episulfide compounds such as 2,5-bis(β-epithiopropylthiomethyl)-1,4-dithiane, 2,5-bis(β-epithiopropylthioethylthiomethyl)-1,4-dithiane, 2,5-bis(β-epithiopropylthioethyl)-1,4-dithiane, and 2,3,5-tri(β-epithiopropylthioethyl)-1,4-dithiane; and aliphatic skeleton-containing episulfide compounds such as 2-(2-β-epithiopropylthioethylthio)-1,3-bis(3-epithiopropylthio)propane, 1,2-bis[(2-β-epithiopropylthioethyl)thio]-3-(β-epithiopropylthio)propane, tetrakis(β-epithiopropylthiomethyl)methane, 1,1,1-tris(β-epithiopropylthiomethyl)propane, and bis(β-epithiopropyl)sulfide. In the present invention, among these, from the viewpoint of providing high refractive index plastic spectacle lenses, bis-(β-epithiopropyl)sulfide, which contains sulfur atoms at a high content ratio, is used.

Furthermore, various additives that are used in optical members as necessary, such as polymerization catalysts such as organic tins such as dimethyltin dichloride, mold release agents such as butoxyethylacid phosphate, antioxidants, ultraviolet stabilizers and anti-coloring agents may be used.

In the case when the optical member is a plastic lens, the polymerization is preferably a mold-injection polymerization process.

For example, a mixture obtained by mixing the above-mentioned monomer composition is injected in a molding mold including a mold made of glass or a metal and a gasket made of a resin in combination, and polymerization is conducted.

The polymerization initiation temperature is preferably from 0 to 45° C., more preferably from 10 to 40° C., further preferably from 15 to 35° C.

Furthermore, the polymerization conditions can be suitably preset depending on the above-mentioned initial temperature. The temperature is raised from the above-mentioned initial temperature, and curing forming is then conducted by heating. For example, the temperature increasing temperature is generally from 110 to 130° C. The temperature increasing time up to this temperature is preferably from 5 to 48 hours, more preferably from 10 to 40 hours, more preferably from 20 to 30 hours. The heating time after the temperature has been increased is preferably from 10 to 30 hours, more preferably from 20 to 30 hours.

Examples of the optical member that can be produced as above include plastic lenses of eye glasses, cameras and the like, prisms, optical fibers, substrates for recording media for use in optical discs and magnetic discs and the like, and optical filters attached to displays of word processors and the like.

Preferable optical members are plastic lenses since they are excellent in transparency without turbidity and clouding, specifically plastic spectacle lenses, for which a high refractive index is required.

[Optical Member]

The optical member of the present invention is formed of a polymer having a structure represented by the formula (1) and at least one kind of structure represented by the formula (2) or (3) (hereinafter simply referred to as "polymer A").

The polymer A has a structure represented by the formula (1) and at least one kind of structure represented by the formula (2) or (3), and preferably has a structure represented by the formula (1) and a structure represented by the formula (2).

[Formula 10]

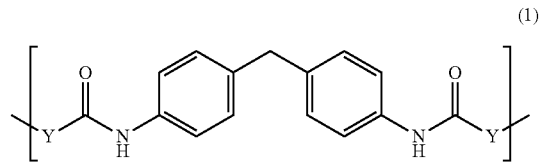

(1)

wherein Y represents a sulfur atom or an oxygen atom,

[Formula 11]

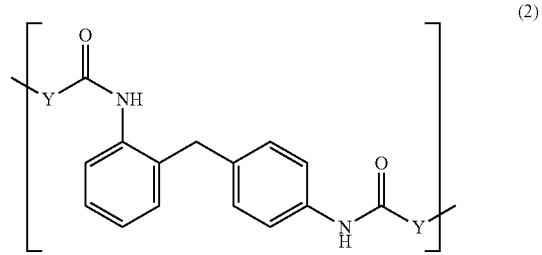

(2)

wherein Y represents a sulfur atom or an oxygen atom,

[Formula 12]

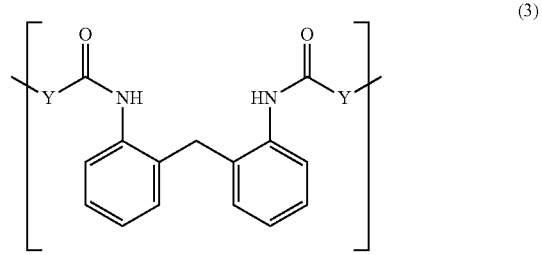

(3)

wherein Y represents a sulfur atom or an oxygen atom.

Preferably, the polymer A further has a structure represented by the formula (5).

[Formula 13]

$$X{\mathrel{\mathop:}}(*)_n \qquad (5)$$

In the formula, X represents a residue formed by removing a mercapto group from a polythiol compound, or a residue formed by removing a hydroxyl group from a polyol compound, * represents a binding site, and n is an integer of 2 to 6. It is preferable that the above-mentioned binding site binds to the site that was substituted with the mercapto group or the hydroxyl group. It is preferable that the above-mentioned binding site binds to Y of the structure represented by the formula (1), and of at least one kind of the structure represented by the formula (2) or (3). n is preferably an integer of 2 to 4.

It is preferable that the polymer A is preferably a poly(thio)urethane in which the formula (1), at least one kind of structure represented by the formula (2) or (3), and the structure represented by the formula (5) are alternately arranged. The order of the arrangement of the structures represented by the formulas (1), (2) and (3) are not specifically limited. The polymer A may also have a unit derived from a dimer of a polyisocyanate compound. The poly(thio)urethane means at least one kind selected from a polythiourethane and a polyurethane.

In the following explanation relating to the optical member of the present invention, the case when X is a sulfur atom is referred to as a first form, and the case when X is an oxygen atom is referred to as a second form. In the production method of the present invention, the case when the raw material is a polythiol compound is referred to as a first form, and the case when the raw material is a polyol compound is referred to as a second form, and these cases respectively correspond to the method for producing the optical member of the first form and the method for producing the optical member of the second form.

(First Form)

The optical member of the present invention is formed of a polymer having a structure represented by the formula (S1) and at least one kind of structure represented by the formula (S2) or (S3) (hereinafter simply referred to as "polymer A1").

The polymer A1 has a structure represented by the formula (S1) and at least one kind of structure represented by the formula (S2) or (S3), and preferably has a structure represented by the formula (S1) and a structure represented by the formula (S2).

[Formula 14]

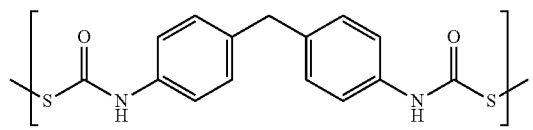

[Formula 15]

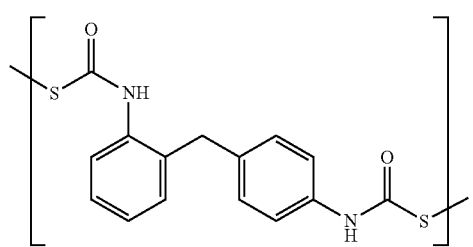

[Formula 16]

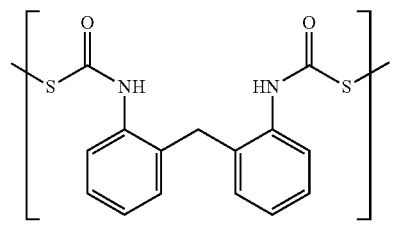

Preferably, the polymer A1 further has a structure represented by the formula (5).

[Formula 17]

$$X{\mathrel{\mathop:}}(*)_n \qquad (5)$$

In the formula, X represents a residue formed by removing a mercapto group from a polythiol compound, * represents a binding site, and n is an integer of 2 to 6. It is preferable that the above-mentioned binding site is positioned on the site that was substituted with the mercapto group. It is preferable that the above-mentioned binding site binds to the sulfur atoms of the structure represented by the formula (1) and of at least one kind of the structure represented by the formula (2) or (3). n is preferably an integer of 2 to 4.

As the polythiol compound for the above-mentioned X, polythiol compounds that are similar to the above-mentioned polythiol compounds are exemplified.

The polythiol compound is preferably at least one kind selected from pentaerythritol tetra(3-mercaptopropionate), 2,3-bis(2-mercaptoethylthio)propane-1-thiol and trimethylolpropane tris(3-mercaptopropionate), more preferably at least one kind selected from pentaerythritol tetra(3-mercaptopropionate) and 2,3-bis(2-mercaptoethylthio)propane-1-thiol, further preferably pentaerythritol tetra(3-mercaptopropionate).

It is preferable that the polymer A1 is preferably a polythiourethane in which the formula (S1), at least one kind of structure represented by the formula (S2) or (S3), and the structure represented by the formula (5) are alternately arranged. The order of the arrangement of the structures represented by the formulas (S1), (S2) and (S3) are not specifically limited. The polymer A1 may also have a unit derived from a dimer of a polyisocyanate compound.

The numerical ratio (M2/M1) of the total (M2) of the structures of residues formed by removing the two isocyanate groups from the 2,4'-MDI or the 2,2'-MDI with respect to the total (M1) of structures of residues formed by removing two isocyanate groups from the 4,4'-MDI contained in the polymer A1 is 5/95 or more, more preferably 10/90 or more, further preferably 15/85 or more, even more preferably 20/80 or more, so as to prevent generation of clouding even when the polymerization initial temperature during the production of the optical member is decreased. Furthermore, M2/M1 is preferably 95/5 or less, more preferably 90/10 or less, further preferably 80/20 or less.

(Second Form)

The optical member of the present invention is formed of a polymer having a structure represented by the formula (O1) and at least one kind of structure represented by the formula (O2) or (O3) (hereinafter simply referred to as "polymer A2").

The polymer A2 has a structure represented by the formula (O1) and at least one kind of structure represented by the formula (O2) or (O3), and preferably has a structure represented by the formula (O1) and a structure represented by the formula (O2).

[Formula 18]

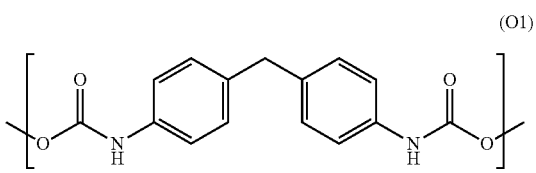

(O1)

[Formula 19]

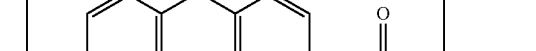

(O2)

[Formula 20]

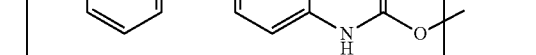

(O3)

Preferably, the polymer A2 further has a structure represented by the formula (5).

[Formula 21]

$X\!\!-\!\!(*)_n$ (5)

In the formula, X represents a residue formed by removing a hydroxyl group from a polyol compound, * represents a binding site, and n is an integer of 2 to 6. It is preferable that the above-mentioned binding site binds to the site that was substituted with the hydroxyl group. The above-mentioned binding site preferably binds to the oxygen atoms of the structure represented by the formula (O1) and of at least one kind of the structure represented by the formula (O2) or (O3). n is preferably an integer of 2 to 4.

As the above-mentioned polyol compound for X, polyol compounds that are similar to the above-mentioned polyol compounds are exemplified. Among these, polyalkylene oxide ethers of polyols are preferable, at least one kind selected from polyoxypropylene glyceryl ether, polyoxyethylene glyceryl ether, polyoxypropylene trimethylolpropyl ether, polyoxypropylene pentaerythritol ether is more preferable, and polyoxypropylene glyceryl ether is further preferable.

It is preferable that the polymer A2 is preferably a polyurethane in which the formula (O1), at least one kind of structure represented by the formula (O2) or (O3), and the structure represented by the formula (5) are alternately arranged. The order of the arrangement of the structures represented by the formulas (O1), (O2) and (O3) are not specifically limited. The polymer A2 may also have a unit derived from a dimer of a polyisocyanate compound.

The numerical ratio (M2/M1) of the total (M2) of the structures of residues formed by removing the two isocyanate groups from the 2,4'-MDI or the 2,2'-MDI with respect to the total (M1) of the structures of residues formed by removing two isocyanate groups from the 4,4'-MDI contained in the polymer A2 is more than 5/95, more preferably 10/90 or more, further preferably 15/85 or more, even more preferably 20/80 or more, even more preferably 30/70 or more, so as to prevent generation of clouding even when the polymerization initial temperature during the production of the optical member is decreased. Furthermore, M2/M1 is preferably 95/5 or less, more preferably 90/10 or less, further preferably 80/20 or less.

[Production Method]

The method for producing the optical member of the present invention includes a step of polymerizing a monomer composition containing a polyisocyanate compound including 4,4'-MDI and at least one kind selected from 2,4'-MDI and 2,2'-MDI, and at least one kind selected from a polythiol compound and a polyol compound.

(Polyisocyanate Compound)

The polyisocyanate compound contained in the monomer composition contains 4,4'-MDI, and at least one kind selected from 2,4'-MDI and 2,2'-MDI, and preferably contains 4,4'-MDI and 2,4'-MDI.

In the first form (the case when the raw material is a polythiol compound), a preferable embodiment relating to the component amounts of the 2,4'-MDI and 2,2'-MDI is as follows.

The total rate of the 2,4'-MDI and 2,2'-MDI with respect to the total amount of the polyisocyanate compound is preferably 5% by mass or more, more preferably 10% by mass or more, further preferably 15% by mass or more, even more preferably 20% by mass or more so as to prevent generation of clouding even when the polymerization initial temperature during the production of the optical member is decreased. Furthermore, the ratio is preferably 95% by mass or less, more preferably 90% by mass or less, further preferably 80% by mass or less.

The mass ratio of the at least one kind selected from 2,4'-MDI and 2,2'-MDI with respect to the 4,4'-MDI (2,4'-MDI and 2,2'-MDI/4,4'-MDI) is preferably 5/95 or more, more preferably 10/90 or more, further preferably 15/85 or more, even more preferably 20/80 or more, so as to prevent generation of clouding even when the polymerization initial temperature during the production of the optical member is decreased. Furthermore, the mass ratio is preferably 95/5 or less, more preferably 90/10 or less, further preferably 80/20 or less.

In the second form (the case when the raw material is a polyol compound), a preferable embodiment relating to the component amounts of the 2,4'-MDI and 2,2'-MDI is as follows.

The total rate of the 2,4'-MDI and 2,2'-MDI with respect to the total amount of the polyisocyanate compound is preferably more than 5% by mass, more preferably 10% by mass or more, further preferably 15% by mass or more, even more preferably 20% by mass or more, even more preferably 30% by mass or more, so as to prevent generation of clouding even when the polymerization initial temperature during the production of the optical member is decreased. Furthermore, the mass ratio is preferably 95% by mass or less, more preferably 90% by mass or less, further preferably 80% by mass or less.

The mass ratio of the at least one kind selected from 2,4'-MDI and 2,2'-MDI with respect to the 4,4'-MDI [(2,4'-MDI and 2,2'-MDI)/4,4'-MDI) is preferably more than 5/95, more preferably 10/90 or more, further preferably 15/85 or more, even more preferably 20/80 or more, even more preferably 30/70 or more, so as to prevent generation of clouding even when the polymerization initial temperature during the production of the optical member is decreased. Furthermore, the mass ratio is preferably 95/5 or less, more preferably 90/10 or less, further preferably 80/20 or less.

It is preferable that the production method of the present invention further includes, prior to the step of polymerization, a step of dissolving the mixture of the polyisocyanate compounds containing 4,4'-MDI and at least one kind selected from 2,4'-MDI and 2,2'-MDI by heating under a condition of 30° C. or more and 120° C. or less. By this step of dissolving by heating, the insoluble components contained in the above-mentioned mixture of the polyisocyanate compounds are dissolved, thereby generation of white turbidity in the obtained optical member in the production steps can be prevented.

The step of dissolving by heating is conducted, for example, by mixing the above-mentioned polyisocyanate compounds, and heating the mixture under stirring. The dissolution by heating is conducted preferably under an inert gas atmosphere.

The temperature for the dissolution by heating is preferably 40° C. or more, more preferably 50° C. or more, and preferably 100° C. or less, more preferably 80° C. or less, further preferably 70° C. or less.

The heating time is preferably 5 minutes or more and 30 minutes or less, more preferably 5 minutes or more and 10 minutes or less.

(Polythiol Compound)

As the polythiol compound, polythiol compounds that are similar to the polythiol compounds for X in the above-mentioned first form are exemplified, and preferable polythiol compounds are also similar to the examples listed in the above-mentioned X.

(Polyol Compound)

As the polyol compound, polyol compounds that are similar to the polyol compounds for X in the above-mentioned second form are exemplified, and preferable polyol compounds are also similar to the examples listed in the above-mentioned X.

The incorporation ratio of the polyisocyanate compounds to the polythiol compound or the polyol compound is such that the molar ratio of NCO group/(SH group or OH group) is generally from 0.5 to 2.0, preferably from 0.95 to 1.05.

Furthermore, besides the above-mentioned raw material monomers, various additives that are used in optical members as necessary, such as polymerization catalysts such as organic tins such as dimethyltin dichloride, mold release agents such as butoxyethylacid phosphate, antioxidants, ultraviolet stabilizers and anti-coloring agents may be used.

In the case when the optical member is a plastic lens, the polymerization is preferably a mold-injection polymerization process.

For example, a mixture obtained by mixing the above-mentioned monomer composition is injected in a molding mold including a mold made of glass or a metal and a gasket made of a resin in combination, and polymerization is conducted.

In the first form, preferable polymerization conditions are as follows.

The polymerization initiation temperature Y is set depending on the total content X (% by mass) of the 2,4'-MDI and 2,2'-MDI.

That is, from a viewpoint of obtaining an optical member with which turbidity and clouding are not caused and which is excellent in transparency, the polymerization initiation temperature Y preferably satisfies the following formulas (Sa), (Sb) and (Sc).

$$Y \geq -X+45 \quad (Sa)$$

$$0<X \quad (Sb)$$

$$0<Y<45 \quad (Sc)$$

wherein X represents a total rate (% by mass) of the 2,4'-MDI and 2,2'-MDI with respect to the total amount of the polyisocyanate compound. Y represents a polymerization initiation temperature (° C.) at which the monomer composition is polymerized.

(Sa) is preferably $Y \geq -X+50$.

(Sb) is preferably $0<X<100$, more preferably $5<X \leq 95$, further preferably $10 \leq X \leq 90$, even more preferably $15 \leq X \leq 80$, even more preferably $20 \leq X \leq 80$.

(Sc) is preferably $0<Y<45$, more preferably $0<Y \leq 40$, further preferably $0<Y \leq 30$, even more preferably $20 \leq Y \leq 30$, even more preferably $25 \leq Y \leq 30$.

The polymerization conditions can be suitably preset depending on the above-mentioned initial temperature. The temperature is raised from the above-mentioned initial temperature, and curing formation is then conducted by heating. For example, the temperature increasing temperature is generally from 110 to 130° C. The temperature increasing time up to this temperature is preferably from 5 to 48 hours, more preferably from 10 to 40 hours, more preferably from 20 to 30 hours. The heating time after the temperature has been increased is preferably from 10 to 30 hours, more preferably from 20 to 30 hours.

In the second form, preferable polymerization conditions are as follows.

The polymerization initiation temperature Y is set depending on the total content X (% by mass) of the 2,4'-MDI and 2,2'-MDI.

That is, from a viewpoint of obtaining an optical member with which turbidity and clouding are not caused and which is excellent in transparency, the polymerization initiation temperature Y preferably satisfies the following formulas (Oa), (Ob) and (Oc).

$$Y \geq -0.46X+45 \quad (Oa)$$

$$0<X \quad (Ob)$$

$$0 \leq Y<45 \quad (Oc)$$

wherein X represents a total rate (% by mass) of the 2,4'-MDI and the 2,2'-MDI with respect to the total amount of the polyisocyanate compound, and Y represents a polymerization initiation temperature (° C.) at which the monomer composition is polymerized.

(Oa) is preferably $Y>-0.46X+50$.

(Ob) is preferably $0<X<100$, more preferably $5<X \leq 95$, further preferably $10 \leq X \leq 90$, even more preferably $15 \leq X \leq 80$, even more preferably $20 \leq X \leq 80$.

(Oc) is preferably $0<Y<45$, more preferably $0<Y \leq 40$, further preferably $0<Y \leq 30$, even more preferably $20 \leq Y \leq 30$.

The polymerization conditions can be suitably preset depending on the above-mentioned initial temperature. The temperature is raised from the above-mentioned initial temperature, and curing formation is conducted by heating. For example, the temperature increasing temperature is generally from 110 to 130° C. The temperature increasing time up to this temperature is preferably from 5 to 48 hours, more preferably from 10 to 40 hours, more preferably from 20 to 30 hours. The heating time after the temperature has been increased is preferably from 10 to 30 hours, more preferably from 20 to 30 hours.

Examples of the optical member that can be produced as above include plastic lenses of eye glasses, cameras and the like, prisms, optical fibers, substrates for recording media for use in optical discs and magnetic discs, and the like, and optical filters attached to displays of word processors and the like.

Preferable optical members are plastic lens since they are excellent in transparency without turbidity and clouding, specifically plastic spectacle lenses for which a high refractive index is required.

EXAMPLES

The present invention will be explained below in more detail with Examples, but the present invention is not limited to these Examples. The plastic lenses obtained in Examples and Comparative Examples were evaluated as follows.
[White Turbidity]
The white turbidity was evaluated by visually observing and evaluating the obtained lens according to the following criteria.
⊙: White turbidity is not confirmed.
○: Slight white turbidity is confirmed.
x: White turbidity is clearly confirmed.

Example 1-1

0.08 g of butoxyethyl acid phosphate as a mold release agent and 0.004 g of dimethyltin dichloride as a polymerization catalyst were put into a 100 ml eggplant flask, 20.24 g of a mixture of 2,4'-MDI and 4,4'-MDI dissolved by heating under an atmosphere at 50° C. was put into the flask, and the mixture was stirred at 50° C. under nitrogen purge for 5 minutes to completely mix and dissolve the mixture.

Subsequently, 19.76 g of pentaerythritol tetra(3-mercaptopropionate) was incorporated, and stirring under a reduced pressure was conducted at 0.13 kPa (1.0 torr) for 10 minutes to give a mixture.

This was injected into a lens mold, and polymerized over 24 hours by a temperature program from an initial temperature of X° C. (25 to 45° C.) to a final temperature of 120° C. to give a lens. White turbidity according to the temperature difference of the above-mentioned initial temperature was visually evaluated. The result is shown in Table 1.

Examples 1-2 to 1-13 and Comparative Examples 1-1

A mixture was prepared in a similar method to that of Example 1, except that the incorporation ratio of the above-mentioned respective components was changed as shown in Table 1.

This was injected into a lens mold, and polymerized over 24 hours by a temperature program from an initial temperature of X° C. (25 to 45° C.) to a final temperature of 120° C. to give a lens. The result is shown in Table 1.

TABLE 1

| | Incorporation amount (parts by mass) | | | | | | Polymerization | |
|---|---|---|---|---|---|---|---|---|
| | MDI | | | | | | | |
| | 2,4'-MDI (% by mass) *1 | 4,4'-MDI (% by mass) *1 | MDI Total | Thiol compound *2 | Polymerization catalyst *3 | Mold release agent *4 | initiation temperature (° C.) | White turbidity |
| Example 1-1 | 20 | 80 | 50.6 | 49.4 | 0.01 | 0.20 | 45 | ⊙ |
| | | | | | | | 30 | ⊙ |
| | | | | | | | 25 | ⊙ |
| Example 1-2 | 25 | 75 | 50.6 | 49.4 | 0.01 | 0.20 | 30 | ⊙ |
| | | | | | | | 25 | ⊙ |
| Example 1-3 | 30 | 70 | 50.6 | 49.4 | 0.01 | 0.20 | 45 | ⊙ |
| | | | | | | | 30 | ⊙ |
| Example 1-4 | 40 | 60 | 50.6 | 49.4 | 0.01 | 0.20 | 45 | ⊙ |
| | | | | | | | 30 | ⊙ |
| Example 1-5 | 55 | 45 | 50.6 | 49.4 | 0.01 | 0.20 | 30 | ⊙ |
| Example 1-6 | 60 | 40 | 50.6 | 49.4 | 0.01 | 0.20 | 30 | ⊙ |
| Example 1-7 | 65 | 35 | 50.6 | 49.4 | 0.01 | 0.20 | 30 | ⊙ |
| Example 1-8 | 70 | 30 | 50.6 | 49.4 | 0.01 | 0.20 | 30 | ⊙ |
| Example 1-9 | 75 | 25 | 50.6 | 49.4 | 0.01 | 0.20 | 30 | ⊙ |
| Example 1-10 | 80 | 20 | 50.6 | 49.4 | 0.01 | 0.20 | 30 | ⊙ |
| Example 1-11 | 5 | 95 | 50.6 | 49.4 | 0.01 | 0.20 | 45 | ⊙ |
| | | | | | | | 40 | ○ |
| Example 1-12 | 10 | 90 | 50.6 | 49.4 | 0.01 | 0.20 | 45 | ⊙ |
| | | | | | | | 40 | ⊙ |
| | | | | | | | 35 | ⊙ |
| | | | | | | | 30 | X |
| Example 1-13 | 15 | 85 | 50.6 | 49.4 | 0.01 | 0.20 | 40 | ⊙ |
| | | | | | | | 35 | ⊙ |
| | | | | | | | 30 | ○ |

TABLE 1-continued

| | Incorporation amount (parts by mass) | | | | | | | |
|---|---|---|---|---|---|---|---|---|
| | MDI | | | | | | Polymerization | |
| | 2,4'-MDI (% by mass) *1 | 4,4'-MDI (% by mass) *1 | MDI Total | Thiol compound *2 | Polymerization catalyst *3 | Mold release agent *4 | initiation temperature (° C.) | White turbidity |
| Comparative Example 1-1 | 0 | 100 | 50.6 | 49.4 | 0.01 | 0.20 | 45 | ⊙ |
| | | | | | | | 40 | X |
| | | | | | | | 35 | X |
| | | | | | | | 30 | X |

*1 Incorporation amount with respect to MDI total (% by mass)
*2 Pentaerythritol tetra(3-mercaptopropionate)
*3 Dimethyltin dichloride
*4 Butoxyethyl acid phosphate Examples 1-14 to 1-20 and Comparative Examples 1-2 to 1-4

A mixture was prepared in a similar method to that of Example 1-1, except that the incorporation ratio of the respective components was changed as shown in Table 2.

The mixture was formulated and injected into a lens mold after a day had lapsed, and polymerized over 24 hours by a temperature program from an initial temperature of X° C. (25 to 45° C.) to a final temperature of 120° C. to give a lens. The result is shown in Table 2.

Comparative Examples 1-5 to 1-10

A mixture was prepared in a similar method to that of Example 1-1, except that the incorporation ratio of the respective components is changed as shown in Table 3.

The mixture was formulated and injected into a lens mold after a day had lapsed, and polymerized over 24 hours by a temperature program from an initial temperature of X° C. (25 to 45° C.) to a final temperature of 120° C. to give a lens. The result is shown in Table 3.

TABLE 2

| | Incorporation amount (parts by mass) | | | | | | | | | |
|---|---|---|---|---|---|---|---|---|---|---|
| | MDI | | | | | | | | Polymerization | |
| | 2.4'-MDI (% by mass) *1 | 4.4'-MDI (% by mass) *1 | Total | Thiol compound | | | Polymerization catalyst *2 | Mold release agent *3 | initiation temperature (° C.) | White turbidity |
| | | | | a | b | c | | | | |
| Example 1-14 | 55 | 45 | 50.6 | 49.4 | — | — | 0.01 | 0.20 | 30 | ⊙ |
| Example 1-15 | 55 | 45 | 59.0 | — | 41.0 | — | 0.01 | 0.20 | 30 | ⊙ |
| Example 1-16 | 55 | 45 | 48.5 | — | — | 51.5 | 0.01 | 0.20 | 30 | ⊙ |
| Example 1-17 | 20 | 80 | 50.6 | 49.4 | — | — | 0.01 | 0.20 | 30 | ⊙ |
| Example 1-18 | 20 | 80 | 59.0 | — | 41.0 | — | 0.01 | 0.20 | 30 | ⊙ |
| Example 1-19 | 25 | 75 | 50.6 | 49.4 | — | — | 0.01 | 0.20 | 30 | ⊙ |
| Example 1-20 | 25 | 75 | 59.0 | — | 41.0 | — | 0.01 | 0.20 | 30 | ⊙ |
| Comparative Example 1-2 | 0 | 100 | 50.6 | 49.4 | — | — | 0.01 | 0.20 | 30 | X |
| Comparative Example 1-3 | 0 | 100 | 59.0 | — | 41.0 | — | 0.01 | 0.20 | 30 | X |
| Comparative Example 1-4 | 0 | 100 | 48.5 | — | — | 51.5 | 0.01 | 0.20 | 30 | X |

*1 Incorporation amount with respect to MDI total (% by mass)
*2 Dimethyltin dichloride
*3 Butoxyethyl acid phosphate
a. Pentaerythritol tetrakis(3-mercaptopropionate)
b. 2,3-Bis(2-mercaptoethylthio)propan-1-thiol
c. Trimethylolpropane tris(3-mercaptopropionate)

TABLE 3

| | Incorporation amount (parts by mass) | | | | | | | | | |
|---|---|---|---|---|---|---|---|---|---|---|
| | Isocyanate compounds | | | | | | | Polymerization | | |
| | XDI (% by mass) *1 | 4,4'-MDI (% by mass) *1 | Thiol compound | | | | Polymerization catalyst *2 | Mold release agent *3 | initiation temperature (° C.) | White turbidity |
| | | | Total | a | b | c | | | | |
| Comparative Example 1-5 | 20 | 80 | 50.6 | 49.4 | — | — | 0.01 | 0.20 | 30 | X |
| Comparative Example 1-6 | 20 | 80 | 59.0 | — | 41.0 | — | 0.01 | 0.20 | 30 | X |
| Comparative Example 1-7 | 20 | 80 | 48.5 | — | — | 51.5 | 0.01 | 0.20 | 30 | X |
| Comparative Example 1-8 | 55 | 45 | 50.6 | 49.4 | — | — | 0.01 | 0.20 | 30 | X |
| Comparative Example 1-9 | 55 | 45 | 59.0 | — | 41.0 | — | 0.01 | 0.20 | 30 | ⊙ |
| Comparative Example 1-10 | 55 | 45 | 48.5 | — | — | 51.5 | 0.01 | 0.20 | 30 | ○ |

*1 Incorporation amount with respect to MDI total (% by mass)
*2 Dimethyltin dichloride
*3 Butoxyethyl acid phosphate
a. Pentaerythritol tetrakis(3-mercaptopropionate)
b. 2,3-Bis(2-mercaptoethylthio)propan-1-thiol
c. Trimethylolpropane tris(3-mercaptopropionate)

Example 2-1

21.23 g of a mixture of 2,4'-MDI and 4,4'-MDI dissolved by heating under an atmosphere at 50° C. was put into a 100 ml eggplant flask, 18.77 g of polyoxypropylene glyceryl ether was then incorporated, and the mixture was stirred under a reduced pressure of 0.13 kPa (1.0 torr) for 10 minutes to give a mixture. The result is shown in Table 4.

This was injected in a lens mold having a glass part whose surface had undergone a mold release treatment with a silicone-based water repellent, and polymerized over 24 hours by a temperature program from an initial temperature of X° C. (25 to 45° C.) to a final temperature of 120° C. to give a lens.

Examples 2-2 to 2-6 and Comparative Example 2-1

A mixture was prepared in a similar method to that of Example 2-1, except that the incorporation ratio of the above-mentioned respective components is changed as shown in Table 4.

This was injected into a lens mold, and polymerized over 24 hours by a temperature program from an initial temperature of X° C. (25 to 45° C.) to a final temperature of 120° C. to give a lens. The result is shown in Table 4.

TABLE 4

| | Incorporation amount (parts by mass) | | | | Polymerization | |
|---|---|---|---|---|---|---|
| | MDI | | | | | |
| | 2,4'-MDI (% by mass) *1 | 4,4'-MDI (% by mass) *1 | Total | Polyol compound *2 | initiation temperature (° C.) | White turbidity |
| Example 2-1 | 55 | 45 | 53.1 | 46.9 | 20 | ⊙ |
| Example 2-2 | 30 | 70 | 53.1 | 46.9 | 35 | ⊙ |
| Example 2-3 | 25 | 75 | 53.1 | 46.9 | 45 | ⊙ |
| | | | | | 35 | ○ |
| Example 2-4 | 20 | 80 | 53.1 | 46.9 | 45 | ⊙ |
| | | | | | 35 | X |
| Example 2-5 | 15 | 85 | 53.1 | 46.9 | 45 | ○ |
| | | | | | 40 | ○ |
| | | | | | 35 | X |
| Example 2-6 | 10 | 90 | 53.1 | 46.9 | 55 | ⊙ |
| | | | | | 45 | ○ |
| | | | | | 40 | ○ |
| | | | | | 35 | X |
| Comparative Example 2-1 | 0 | 100 | 53.1 | 46.9 | 45 | ○ |
| | | | | | 40 | X |

*1 Incorporation amount with respect to MDI total (% by mass)
*2 polyoxypropylene glyceryl ether (weight average molecular weight: 300)

Reference Example

Isocyanate compositions having the components indicated in the following Table 5 were prepared, and the refractive indices were measured. The refractive indices were measured at 25° C. by D-ray by means of a refractometer RA-500N manufactured by Kyoto Electronics Manufacturing Co., Ltd.

TABLE 5

| Mass ratio (% by mass) | | |
|---|---|---|
| 45% | 55% | Index |
| 4,4'-MDI | 2,4'-MDI | 1.6008 |
| 4,4'-MDI | XDI | 1.5693 |
| 4,4'-MDI | HDI | 1.5150 |
| 4,4'-MDI | TDI | 1.5820 |

XDI: xylene diisocyanate
HDI: hexamethylene diisocyanate
TDI: tolylene diisocyanate
* TDI is a mixture of 2,4-TDI (80%) and 2,6-TDI (20%).

INDUSTRIAL APPLICABILITY

According to the present invention, a polyisocyanate monomer composition for optical members, which can provide an optical member with which turbidity and clouding are difficult to generate during the production thereof, and which is excellent in transparency, and an optical member and a production method therefor can be provided, and thus the optical member can be preferably utilized as a plastic lens, specifically as plastic spectacle lenses.

The invention claimed is:

1. An optical member comprising a polymer having a structure of formula (S1), and at least one structure of formula (S2) or (S3), and a structure of formula (5):

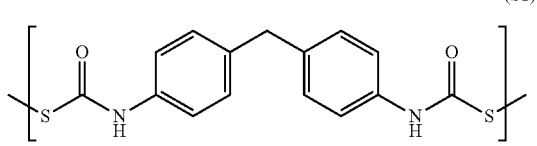
(S1)

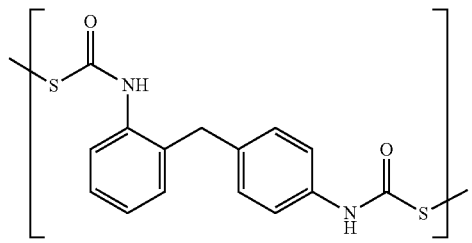
(S2)

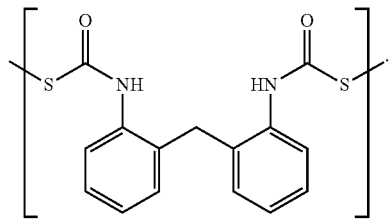
(S3)

$$X{-}(*)_n \quad (5)$$

wherein X represents a residue formed by removing a mercapto group from a polythiol compound, * represents a binding site, and n is an integer of 2-6, and the polythiol compound comprises at least one selected from the group consisting of pentaerythritol tetra (3-mercaptopropionate), 2,3-bis (2-mercaptoethylthio) propane-1-thiol and trimethylolpropane tris(3-mercaptopropionate).

2. The optical member according to claim 1, wherein the numerical ratio (M2/M1) of the total (M2) of the structures of residues formed by removing the two isocyanate groups from the 2,4'-diphenylmethane diisocyanate or the 2,2'-diphenylmethane diisocyanate with respect to the total (M1) of the structures of residues formed by removing the two isocyanate groups of the 4,4'-diphenylmethane diisocyanate contained in the polymer is 5/95 or more.

3. The optical member according to claim 1, wherein the numerical ratio M2/M1 is 15/85 or more.

4. The optical member according to claim 1, wherein the numerical ratio M2/M1 is 20/80 or more.

5. The optical member according to claim 1, wherein the polythiourethane polymer has the structure of formula (S1), the structure of formula (S2), and the structure of formula (5).

* * * * *